US012596349B2

(12) United States Patent
Pai

(10) Patent No.: US 12,596,349 B2
(45) Date of Patent: Apr. 7, 2026

(54) COMPUTER-AUTOMATED SCRIPTED ELECTRONIC ACTOR CONTROL

(71) Applicant: Vivek Pai, Walpole, MA (US)

(72) Inventor: Vivek Pai, Walpole, MA (US)

( * ) Notice: Subject to any disclaimer, the term of this patent is extended or adjusted under 35 U.S.C. 154(b) by 441 days.

(21) Appl. No.: 18/078,562

(22) Filed: Dec. 9, 2022

(65) Prior Publication Data

US 2023/0236575 A1 Jul. 27, 2023

Related U.S. Application Data

(60) Provisional application No. 63/303,191, filed on Jan. 26, 2022.

(51) Int. Cl.
*G05B 19/4155* (2006.01)
(52) U.S. Cl.
CPC ............... *G05B 19/4155* (2013.01); *G05B 2219/45007* (2013.01)
(58) Field of Classification Search
CPC ...... G05B 19/4155; G05B 2219/45007; G06F 40/56
See application file for complete search history.

(56) References Cited

U.S. PATENT DOCUMENTS

| | | | |
|---|---|---|---|
| 6,160,986 A | 12/2000 | Gabai et al. | |
| 6,285,380 B1 | 9/2001 | Perlin et al. | |
| 6,959,166 B1 | 10/2005 | Gabai et al. | |
| 8,428,777 B1 | 4/2013 | Poursohi et al. | |
| 8,888,494 B2 | 11/2014 | Threewits | |

| | | | |
|---|---|---|---|
| 9,205,557 B2 * | 12/2015 | Maisonnier | ............... G06F 8/34 |
| 10,500,718 B2 | 12/2019 | Kuffner, Jr. et al. | |
| 10,565,985 B1 | 2/2020 | Huang | |
| 10,606,952 B2 | 3/2020 | Ferrucci et al. | |
| 10,929,759 B2 | 2/2021 | Shinn et al. | |

(Continued)

FOREIGN PATENT DOCUMENTS

| | | |
|---|---|---|
| CN | 102580327 B | 8/2013 |
| CN | 105975622 A | 9/2016 |

(Continued)

OTHER PUBLICATIONS

International Search Report and Written Opinion mailed May 4, 2023, in international patent application No. PCT/US2023/010293, 9 pages.

(Continued)

*Primary Examiner* — Vincent H Tran
(74) *Attorney, Agent, or Firm* — Blueshift IP; Robert Plotkin

(57) ABSTRACT

Computer-implemented systems and methods use a story to automatically control and coordinate electronic actors. The story may be written in a natural language (e.g., English), rather than a programming language or other language designed specifically to control machines. Embodiments of the present invention may parse the story into a script and generate cue signals based on the story. The cue signals are provided to the electronic actor(s), which may perform actions based on their interpretations of those cue signals. As a result, the story, the script, and the cue signals issued to the electronic actors do not deterministically dictate the actions performed by the electronic actors.

16 Claims, 5 Drawing Sheets

(56) References Cited

U.S. PATENT DOCUMENTS

| | | | | |
|---|---|---|---|---|
| 2003/0130851 A1* | 7/2003 | Nakakita | ................. | A63H 3/28 |
| | | | | 704/275 |
| 2010/0008639 A1* | 1/2010 | Greenberg | ......... | H04N 21/8543 |
| | | | | 386/E5.001 |
| 2012/0150346 A1* | 6/2012 | Wieland | ................... | A63G 7/00 |
| | | | | 901/50 |
| 2012/0197436 A1* | 8/2012 | Maisonnier | ............... | G06F 8/34 |
| | | | | 700/250 |
| 2013/0226588 A1* | 8/2013 | Irmler | .................... | G10L 13/00 |
| | | | | 704/E21.001 |
| 2018/0329957 A1 | 11/2018 | Frazzingaro | | |
| 2019/0105772 A1 | 4/2019 | Rusu | | |
| 2020/0369333 A1* | 11/2020 | Lavalley | .............. | B25J 11/0035 |
| 2021/0197394 A1* | 7/2021 | Bravo Sánchez | ...... | G06N 3/004 |
| 2021/0232121 A1* | 7/2021 | Pramanick | .............. | G06F 40/30 |
| 2021/0232136 A1 | 7/2021 | Griffin et al. | | |
| 2021/0383800 A1* | 12/2021 | Pair | ......................... | G10L 15/22 |

FOREIGN PATENT DOCUMENTS

| | | |
|---|---|---|
| CN | 110879556 A | 3/2020 |
| CN | 110968055 A | 4/2020 |
| KR | 20130068603 A | 6/2013 |
| KR | 20140103489 A | 8/2014 |
| KR | 20140111786 A | 9/2014 |
| WO | 2019064287 A1 | 4/2019 |

OTHER PUBLICATIONS

Diankov, R. (2010). Automated Construction of Robotic Manipulation Programs (PhD thesis, CarnegieMellon University, CMU-RI-TR-10-29). Published: Aug. 26, 2010. 263 pages.

Indian Examination Report issued in App. No. IN202427062921, dated Sep. 10, 2025, 8 pages.

Japanese Office Action (including English translation) issued in App. No. JP2024565894, dated Aug. 18, 2025, 9 pages.

Masaki Hayashi, Steven Bachelder , Masayuki Nakajima, Takego Nigorikawa, "Development of T2V on Unity SKD", ITE Technical Report, vol. 38, No. 16, Nippon, ITE, Mar. 17, 2014, pp. 91-94.

National Science Foundation (2020). National Robotics Initiative 2.0: Ubiquitous Collaborative Robots(NRI-2.0) (Solicitation, NSF 20-522). Published: Feb. 14, 2020. 33 pages.

Extended European Search Report issued in EP23747470, dated Jan. 23, 2026, pp. 1-10.

* cited by examiner

300

LOADING A STORY

STORY EXECUTION ENGINE

BLUETOOTH LOW ENERGY

DEVICE

RECEIVE CHARACTER INFO

RECEIVE LARGE DATA

STORY → PARSE STORY →

SCRIPT
SCRIPT LINE
SCRIPT LINE
SCRIPT LINE

PARSE LINES →

LINES

CREATE CHARACTERS →

CHARACTERS

CHARACTER_1 DIALOGUE LINE
CHARACTER_2 NON-DIALOGUE LINE

DETERMINE LINES THAT REQUIRE TRANSMISSION OF LARGE DATA (e.g. AN AUDIO FILE) →

ASSIGN CHARACTERS TO DEVICES (IF NECESSARY) →

SEND "LARGE DATA" TO CORRESPONDING DEVICES

NOTE: DEVICES COULD HAVE ALREADY BEEN ASSIGNED A CHARACTER DUE TO A PREVIOUS LOAD OF THE SAME STORY

FIG. 3

COMPUTER-AUTOMATED SCRIPTED ELECTRONIC ACTOR CONTROL

BACKGROUND

Various techniques exist for controlling animatronics, toys, and other devices (all of which are examples of "electronic actors," as that term is used herein) for carrying out actions described in, or implied by, a script. Such techniques typically require a significant amount of control and effort by a human programmer and/or operator.

For example, one or more human operators may engage in direct, live control of electronic actors, such as by using the Sphero app (for controlling Sphero robots) or the Anduril lattice platform. Although this type of control can be effective in controlling the electronic actors to perform desired actions, the human operator(s) must manually control the electronic actors to perform such actions, which can be tedious, time-consuming, and expensive.

Trigger-based control systems include rules, each of which include a condition and an action. If a rule's condition is satisfied, then the rule's action is performed. An example is sounding an alarm (action) at a specified time (condition). Examples of such trigger-based control systems are If This Then That (IFTTT), the Philips Hue app, and Pharos Designer 2. Such systems can be used to control electronic actors by creating rules in which the actions are to be performed by the electronic actors. Although trigger-based control systems introduce some degree of automation in comparison to live manual control, the rules in a trigger-based control system must still be programmed manually, which requires painstaking anticipation of all relevant conditions that may occur, and their corresponding actions. This can be tedious, time-consuming, and error-prone. Furthermore, trigger-based control systems are rigid in the sense that satisfaction of the same conditions will always result in performance of the same actions. Such systems, therefore, are not desirable for situations in which variety of action is desired.

Programming-based control systems offer greater flexibility than trigger-based control systems by allowing human programmers to create actor-control programs that include more sophisticated logic and combinations of actions than trigger-based control systems. Examples of programming-based control systems are block programming systems (such as Lego Mindstorms, Scratch, Blockly, and MIT App Inventor), and coding-based systems (such as Mu Editor). Although such systems have the advantage of being able to control electronic actors in more flexible and sophisticated ways than trigger-based control systems, and eliminate the need for live control, they require a significant investment of time to learn how to use and to program, and they still deterministically control the electronic actors. Such systems, therefore, are also not desirable for situations in which greater variety of action is desired.

What is needed, therefore, are systems for automating the control of electronic actors which require minimal human effort to use and which are capable of producing a variety of actions based on the same human input.

SUMMARY

Computer-implemented systems and methods use a story to automatically control and coordinate electronic actors. The story may be written in a natural language (e.g., English), rather than a programming language or other language designed specifically to control machines.

Embodiments of the present invention may parse the story into a script and generate cue signals based on the story. The cue signals are provided to the electronic actor(s), which may perform actions based on their interpretations of those cue signals. As a result, the story, the script, and the cue signals issued to the electronic actors do not deterministically dictate the actions performed by the electronic actors.

Other features and advantages of various aspects and embodiments of the present invention will become apparent from the following description and from the claims.

BRIEF DESCRIPTION OF THE DRAWINGS

FIG. 3 is a diagram of a system for loading a script according to one embodiment of the present invention.

DETAILED DESCRIPTION

Computer-implemented systems and methods use a story to automatically control and coordinate electronic actors. The story may be written in a natural language (e.g., English), rather than a programming language or other language designed specifically to control machines. Embodiments of the present invention may parse the story into a script and generate cue signals based on the story. The cue signals are provided to the electronic actor(s), which may interpret the cue signals to perform actions based on their interpretations of those cue signals. As a result, the story, the script, and the cue signals issued to the electronic actors do not deterministically dictate the actions performed by the electronic actors.

Figure 1:
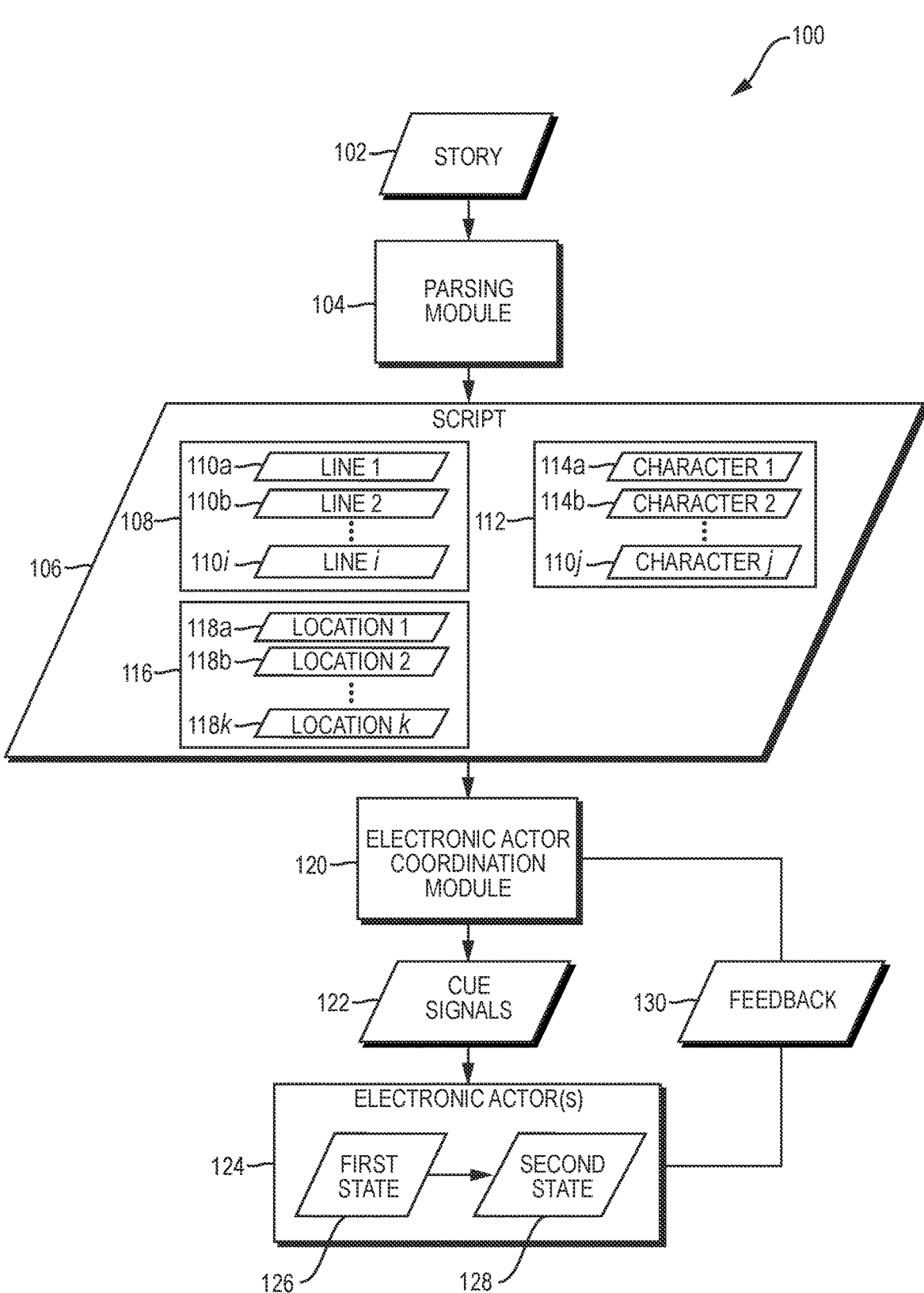
FIG. 1 is a diagram of a computer-implemented system for using a story to automatically control one or more electronic actors according to one embodiment of the present invention.
Figure 2:
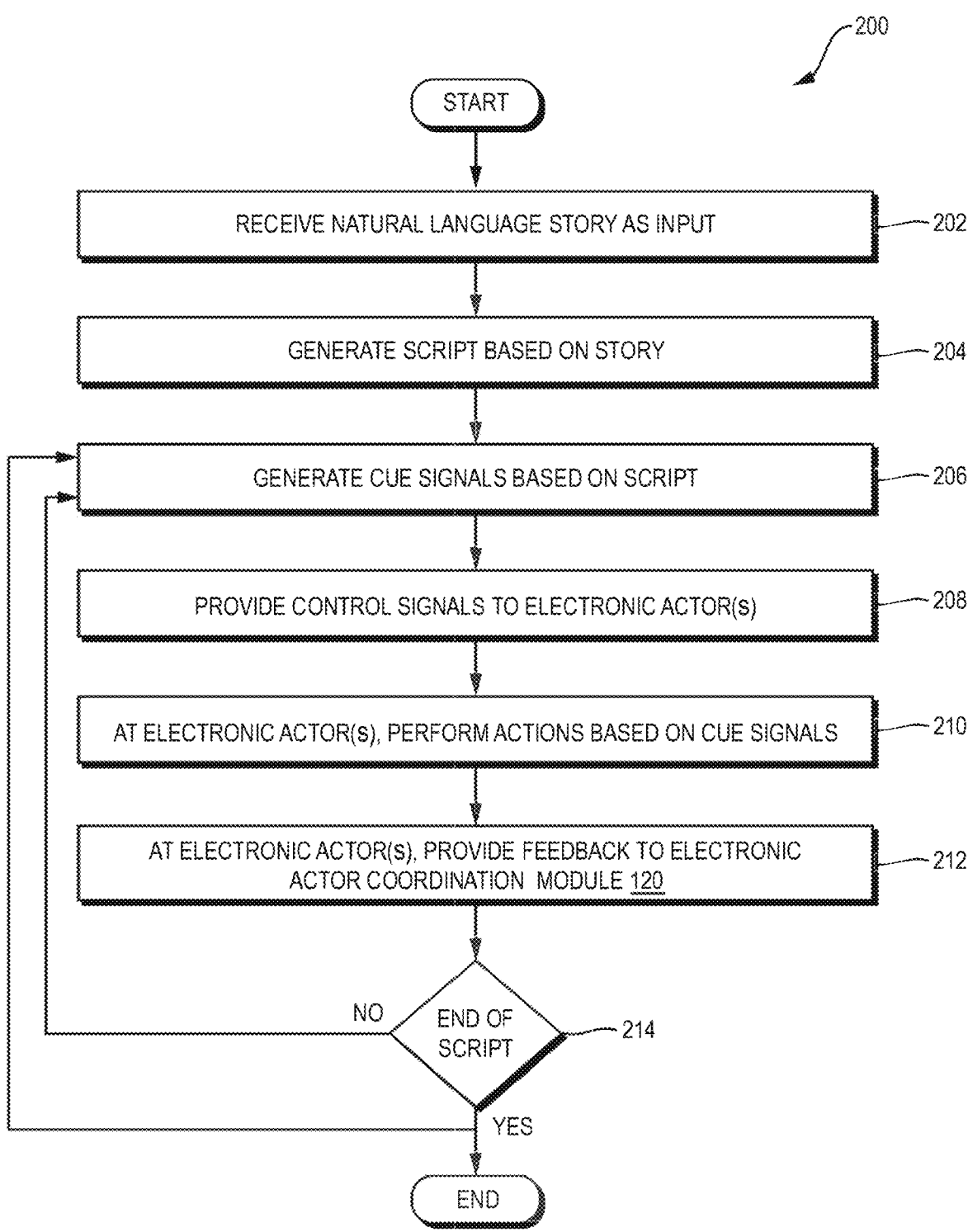
FIG. 2 is a flowchart of a method performed by the system of FIG. 1 according to one embodiment of the present invention.

Referring to FIG. 1, a diagram is shown of a computer-implemented system 100 for using a story 102 to automatically control one or more electronic actors 124 according to one embodiment of the present invention. Referring to FIG. 2, a flowchart is shown of a method 200 performed by the system 100 of FIG. 1 according to one embodiment of the present invention.

The system 100 includes a story 102. The story 102 may, for example, include any one or more of the following, in any combination:

- text data (e.g., text data representing text written in a natural language, such as English);
- audio data (e.g., audio data representing natural and/or synthesized speech);
- image data (e.g., image data representing a natural and/or synthesized image); and
- video data (e.g., video data representing a natural and/or synthesized video).

As one particular example, the story 102 may include text data and not audio data. As another example, the story 102 may include text data and not audio data, image data, or video data. For example, the story 102 may solely include text data, which may, for example, include or consist of text data representing data written in a natural language.

The story 102 may, for example, include data representing a story involving one or more characters. The story 102 may, for example, include data describing any one or more of the following, in any combination: words spoken by the characters, actions performed by the characters, emotions of the characters, and locations in the story. The story 102 may, for example, contain natural language text in the form of a playscript or screenplay. The story 102 may, for example, solely contain text written in a natural language, or may contain text written in a natural language in addition to text and/or other data not written in a natural language (e.g., text written in a programming language and/or scripting language).

The system 100 also includes a parsing module 104. The parsing module 104 receives the story 102 as input (FIG. 2, operation 202). For example, the story 102 may be stored in a file in a filesystem, and the parsing module 104 may receive the story 102 as input by opening and reading the file. As another example, a human user (not shown) may type, speak, or otherwise manually input the story 102 into the parsing module 104 using one or more input devices (e.g., keyboards, touchscreens, and microphones) and associated software (e.g., text editing applications and/or speech recognition applications).

More generally, components of the system 100 (such as one or more of the electronic actors 124) may receive input from one or more human users even if those users do not provide such input intentionally. For example, the system 100 may use any of a variety of sensors (e.g., one or more cameras, microphones, and/or physiological sensors) to obtain sensor data (e.g., image data, video data, audio data, and/or physiological data, in any combination) from one or more of the human users, whether or not such human users provide that input intentionally. For example, a human user may interact with the system 100 naturally and/or merely be in the environment of the system 100 without intentionally interacting with the system 100, and the system 100 may obtain sensor data from that human user. Such sensor data is an example of "input" as that term is used herein. Therefore, it should be understood that any function that is disclosed herein as being performed on "input" may be performed on any input, such as any input received from one or more human users, including input provided intentionally and/or input not provided intentionally by the one or more human users. As merely one example of a function that the system 100 may perform on such input is deriving an estimate of a human user's emotional state based, in whole or in part, on input received from that human user.

The parsing module 104 generates, based on the story 102, a script 106 (FIG. 2, operation 204). The script 106 may include for example, data representing any one or more of the following, in any combination: one or more lines 108, one or more characters 112, and one or more locations 116. As will be described in more detail below, the parsing module 104 may generate the lines 108, characters 112, and/or locations 116 based on the story 102 in any of a variety of ways. In general, the parsing module 104 may identify content (e.g., text data, audio data, images data, and/or video data) in the story 102 representing the lines 108 and, based on that content, generate the lines 108. Similarly, the parsing module 104 may identify content in the story 102 representing the characters 112 and, based on that content, generate the characters 112. Similarly, the parsing module 104 may identify content in the story 102 representing the locations 116 and, based on that content, generate the locations 116.

As will be described in more detail below, embodiments of the present invention may, but need not, include all of the elements shown in FIG. 1 and may, but need not, perform all of the operations shown in FIG. 2. As merely one example, some embodiments of the present invention may not include the story 102 and/or the parsing module 104, and may not perform operations 202 and 204. Such embodiments may include or receive, for example, the script 106, but not generate the script 106. For example, such embodiments may not generate the script 106 based on the story 102.

As another example, any functions disclosed herein as being applied to the script 106 may, additionally or alternatively, be applied to the story 102. For example, embodiments of the present invention may omit the parsing module 104 and the script 106, and may not perform operation 204, in which case embodiments of the present invention may perform other functions disclosed herein (e.g., operation 206) on the story 102 rather than on the script 106. As this implies, functions such as operation 206 may be performed directly on the story 102, without generating the script 106 based on the story 102. These are merely examples, and other embodiments are within the scope of the present invention.

The lines 108 are shown in FIG. 1 as including lines 110a-i, where i may be any number. Similarly, the characters 112 are shown in FIG. 1 as including characters 114a-j where j may be any number. Similarly, the locations 116 are shown in FIG. 1 as including locations 118a-k, where k may be any number. The values of i, j, and k may be the same as or differ from each other, and need not have any relationship to each other.

The script 106 may include data (not explicitly shown in FIG. 1) representing relationships among the lines 108, characters 112, and locations 116. For example, the script 106 may include data indicating that a particular one of the lines 108 is spoken by a particular one of the characters 112. As another example, the script 106 may include data indicating that a particular one of the lines 108 is spoken at a particular one of the locations 116. As yet another example, the script 106 may include data indicating that a particular one of the characters 112 is located at a particular one of the locations 116.

The lines 108 may take any of a variety of forms and may include any of a variety of data. For example, each of the lines may be any one of the following types: narration, dialogue, and non-dialogue. A line may, for example, include text, such as text representing words intended to be spoken by one or more of the characters 112. As another example, a line may include audio data, such as audio data representing words intended to be spoken by one or more of the characters 112. As another example, a line may include a description of an action to be performed by one of the characters 112. Such action descriptions may define actions at any level of generality, such as by describing a specific physical action to be performed by the character (e.g., move right arm to the left); by describing a general action to be performed by the character, but without specifying any particularly physical actions for implementing that general action (e.g., move two feet to the left); or by describing an emotion to express (e.g., happiness or surprise).

The parsing module 104 may generate the lines 108 based on the story 102 in any of a variety of ways. For example, the parsing module 104 may copy a line verbatim from the story 102, such as in the case of a line of dialogue that is contained in the story 102 and is copied into one of the lines 108. Some or all of the lines 108 in the script 106, however, may not appear explicitly in the story 102. For example, if the story 102 includes content that describes and/or shows a character expressing happiness, the parsing module 104 may generate, based on that content, one or more lines 108 containing specific text that expresses happiness (e.g., "I feel happy") and/or specifying actions that express happiness (e.g., smiling).

When generating the lines 108 based on the story 102, the parsing module 104 may distinguish between lines that are actionable (e.g., lines describing a behavior that can be performed by one of the electronic actors 124) and lines that are non-actionable (e.g., lines describing a behavior that cannot be performed by any of the electronic actors 124). Lines that are actionable may, for example, include action verbs related to movement (e.g., "walk," "fly," "jump"), non-verbal communication (e.g., "bark," "grumble"), and changing state (e.g., "light up"). Examples of text in the story 102 that may cause the parsing module 104 to generate actionable (non-dialogue) lines 108, associated with characters 112, in the script 106 are "Victor jumped when he heard the news," "The dog started barking," and "Lily's face beamed."

When the parsing module 104 encounters a non-actionable line in the story 102, the parsing module 104 may, for example, include that line as a line of narration in the script 106. Such a line of narration may or may not be associated with one of the characters 112. For example, a line of narration may not be associated with any of the characters 112, and instead be spoken by the voice of a non-character narrator. An example of text in the story 102 that the parsing module 104 may interpret as a non-actionable line, and include in the script 106 as a non-dialogue line, is "Victor was planning to go to the store, but decided not to."

The characters 112 may take any of a variety of forms and may include any of a variety of data. For example, each of the characters 112 may be any one or more of the following, in any combination: text representing a name of the character; an image and/or video depicting the character; a unique identifier of the character; and a description of the character.

The parsing module 104 may generate the characters 112 based on the story 102 in any of a variety of ways. For example, if the story 102 is in the form of a playscript, screenplay, or other text that specifically assigns dialogue and/or movements to characters by name (e.g., "Mary: Welcome to my home") or descriptor (e.g., "mailman"), the parsing module 104 may generate characters having the names or descriptors contained in the story 102. As another example, if the story includes one or more images or videos of characters, the parsing module 104 may use image recognition technology to identify characters within those images or videos and create corresponding characters 112 in the script 106.

The locations 118a-k may take any of a variety of forms and may include any of a variety of data. For example, a location may include data specifying an absolute location (e.g., GPS coordinates) or a relative location (e.g., two feet to the right). A location may include data specifying a position, a place specified by name or other description (e.g., "home," "office," "red brick building," "park"), or a character (to indicate the location of that character).

The parsing module 104 may generate the locations 116 based on the story 102 in any of a variety of ways. For example, if the story 102 is in the form of a playscript, screenplay, or other text that includes stage directions or other directions associated with characters, the parsing module 104 may generate one or more locations corresponding to those stage directions. As another example, if the story

102 includes text describing a location, then the parsing module 104 may generate a location that includes a verbatim copy of that text. As another example, if the story 102 includes text describing a location without specifying coordinates or another position, the parsing module 104 may generate, based on that text, a location that specifies particular coordinates or another position. As another example, if the story 102 includes an image or video of a location, the story 102 may generate a location that includes that image or video, and/or text describing the location shown in the image or video.

One way in which the script 106 may indicate that the locations of the characters 112 may change over time is by storing data representing an association relating a particular one of the lines 108 to a particular one of the characters 112 and a particular one of the locations 116, thereby indicating that the specified character is located at the specified location at the time of speaking the specified line. The script 106 may also include data representing an association between the same character and a different line and location, thereby indicating that the specified character is located at that different location at the time of speaking that different line.

The script 106 may, but need not, be stored in a form that is human-readable, such as in the form of a conventional playscript or screenplay, containing text in a form such as "<Character Name>:<Line>" (e.g., "Victor: Good morning"). Even if the script 106 is not stored in such a human-readable format, the system 100 may render the script 106 in such a format for viewing by human users on any output device, such as a display screen.

The system 100 also includes an electronic actor coordination module 120, which generates, based on the script 106, one or more cue signals 122 (FIG. 2, operation 206). As described in more detail below, the electronic actor coordination module 120 generates the cue signals 122 to be tailored to cause one or more electronic actors 124 to perform actions consistent with the script 106 (and thereby consistent with the story 102, if the script 106 was generated based on, or is otherwise associated with, the story 102).

Any of the cue signals 122 may, for example, be or include any one or more of the following, in any combination:

text, such as text, written in a natural language, which may, for example, represent speech (e.g., some or all of a dialogue);

an audio cue, e.g., text, instructions to generate audio data, or audio data itself;

data specifying speech;

a lighting cue, such as a cue that specifies a particular external hue, brightness, atmospheric lighting, and/or directional lighting; and a movement cue.

The electronic actor coordination module 120 may, for example, be physically distinct from one or more of the electronic actors 124. For example, the electronic actor coordination module 120 may be physically distinct from (e.g., not contain, be contained within, or be attached to) some or all of the electronic actors 124, and the electronic actor coordination module 120 may communicate with (e.g., provide the cue signals 122 to, and received the feedback 130 from) some or all of the electronic actors 124 via wired and/or wireless network connections. Alternatively, for example, one or more of the electronic actors 124 may include the electronic actor coordination module 120. For example, each of two or more of the electronic actors 124 may contain their own instances of the electronic actor coordination module 120. As this implies, the electronic actor coordination module 120 shown in FIG. 1 may be implemented using a plurality of electronic actor coordination modules.

The electronic actor coordination module 120 provides (e.g., transmits) the cue signals 122 to the electronic actor(s) 124 (FIG. 2, operation 208), in response to which the electronic actor(s) 124 perform one or more actions based on the cue signals 122 (FIG. 2, operation 210). Although there may be more than one electronic actor 124, the description herein may refer to a single electronic actor 124 solely for ease of explanation. Any such description should be understood to be equally applicable to a plurality of electronic actors.

The electronic actor coordination module 120 may provide the cue signals 122 to the electronic actor(s) 124 in any of a variety of ways. For example, the electronic actor coordination module 120 may provide a cue signal to an electronic actor by transmitting the cue signal over a network. Such transmitting may, for example, include addressing the cue signal to the electronic actor. The network may include, for example, a Local Area Network (LAN) and/or a Wide Area Network (WAN) (such as the Internet), in any combination. The network may be wired and/or wireless, in any combination. Such transmitting may, for example, use Bluetooth and/or Near Field Communication (NFC) to transmit the cue signal to the electronic actor. Such transmitting may, for example, include transmitting the cue signal (e.g., over a network) to a device (e.g., a server) other than the electronic actor 124, and such device may transmit the cue signal to the electronic actor 124, either directly or indirectly.

The cue signals 122 may provide sufficient information for the corresponding electronic actor 124 to make a decision about how to act (or whether not to act) based on the cue signals 122. The cue signal 122 for a particular action may, for example, contain the original "stemmed" action verb from the script 106 and/or story 102, along with a hierarchy of its hypernyms (more general words that group together a set of specific words in meaning). Consider the following examples:

Example cue signal #1: The original line in the script 106 is: "Victor ran inside the house as soon as he heard the blast." The resulting cue signal(s) may specify: Run (move) inside (30,6, 10). In this example, "run" is the stemmed action verb used in the original line. "Move" is the hypernym of "run." "Inside" indicates that the action has a target. (30, 6, 10) is the target of the action (which might be another electronic actor).

Example cue signal #2: The original line in the script 106 is: "Tom smiled as he heard the news." The resulting cue signals may specify: Smile (grimace, communicate, interact, move). In this example, "smile" is the stemmed action verb used in the original line. "Grimace," "communicate," "interact," and "move" are its hypernyms.

Now consider three robots (which are examples of electronic actors):

Robot #1 has legs, arms, and a static face (e.g., a toy soldier)

Robot #2 has wings and a dynamic face (e.g., a flying monkey)

Robot #3 has no ability to move, no face, and only a single LED (e.g., a telephone)

For cue signal #2 (Smile (grimace, communicate, interact, move)):

Robot #1 recognizes only the action verb "move."There is no target, however, and so the robot executes a general routine to flinch its arms and legs.

Robot #2 recognizes "smile." It launches the "smile" routine in its facial module to display a smile.

Robot #3 cannot interpret "smile" or "grimace." Instead, it has a general routine for "communicate," which involves blinking its single LED.

The cue signals 122 may, but need not, specify particular actions to be performed by the electronic actors 124. For example, the cue signals 122 may specify that one of the electronic actors 124 is to perform a particular physical movement, in response to which that electronic actor may perform that particular physical movement. Alternatively, for example, the cue signals 122 may represent a cue signal defined at a higher level of abstraction. For example, the cue signals 122 may represent a cue signal to a particular one of the electronic actors 124 to move to the left, without specifying any particular physical action(s) for moving to the left. In response to receiving such cue signals 122, the electronic actor 124 may select and perform a particular physical action for moving to the left, such as rotating one or more wheels, or moving robotic legs.

As described above, the electronic actor coordination module 120 may provide the cue signals 122 to the electronic actors 124. For a first line in the script 106, this may include, at the electronic actor coordination module 120:

generating, based on the first line, a first cue signal corresponding to the first line;

identifying a first character (e.g., from among the characters 112) associated with the first line;

identifying a first electronic actor (e.g., from among the electronic actors 124) associated with the first character; and generating a first cue signal representing the first line.

The term "first" in "first line," and elsewhere herein, is merely a label and does not imply an order, whether temporal, spatial, or otherwise. For example, the "first line" is not necessarily the line that occurs at the beginning of the lines 108 in the script 106. In fact, if the lines 108 are ordered (in whole or in part), the "first line" may occur at any position within that ordering. The term "first line" is used merely to distinguish the first line from other lines, such as a "second line," a "third line," etc. More generally, the same is true of the term "first" as an adjective that modifies any other term herein, such as "character," "location," and "electronic actor."

The electronic actor coordination module 120 may, for example, repeat, in connection with any additional lines in the script 106, any of the operations disclosed herein in connection with the first line. For example, the electronic actor coordination module 120 may repeat any such operations in connection with a second line, a third line, etc., in the lines 108 in the script. For example, the electronic actor coordination module 120 may loop over some or all of the lines 108 in the script and perform, in connection with each such line, any of the operations disclosed herein in connection with the first line.

Different cue signals (e.g., corresponding to different lines in the script 106) may be received by, interpreted by, and acted on by different ones of the electronic actors 124, which may perform different actions in response. For example, a first one of the cue signals 122 may be received by a first one of the electronic actors 124, which may interpret the first cue signal and perform a first action based on that interpretation; a second one of the cue signals 122 may be received by a second one of the electronic actors 124, which may interpret the second cue signal and perform a second action (which may differ from the first action) based on that interpretation.

As another example, multiple cue signals may be received by the same electronic actor, which may interpret those cue signals and perform different actions based on the multiple cue signals. More specifically, a first one of the cue signals 122 may be received by a first one of the electronic actors 124, which may interpret the first cue signal and perform a first action based on that interpretation; a second one of the cue signals 122 may be received by the first one of the electronic actors 124, which may interpret the second cue signal and perform a second action (which may differ from the first action) based on that interpretation.

As these examples illustrate, the electronic actors 124 may receive the cue signals 122, interpret the cue signals 122, select one or more actions to perform based on the cue signals 122, and perform the selected action(s). The cue signals 122 may or may not describe the selected action(s). Furthermore, any particular electronic actor may or may not deterministically select the action(s) to perform. For example, the process of selecting the action(s) to perform may include the use of a pseudorandom number generator, such that the electronic actor may select one or another action(s) to perform based on the output of the pseudorandom number generator. As this example implies, the electronic actor may receive the same control signals twice, yet select and perform different actions to perform each time. The same is true even if no pseudorandom number generator is involved. For example, the electronic actor's selection of the action(s) to be performed may be influenced by inputs in addition to the cue signals 122, such as any one or more of the following: time, location, user input, audio input, image/video input, particular capabilities of the electronic actor, and data received over a network. As a result, the same cue signals 122 may cause the electronic actor to perform different actions, based on a function of the cue signals 122 and such other inputs.

The electronic actors 124 may interpret the cue signals 122 in any of a variety of ways. For example, an electronic actor may interpret a cue signal to identify an action to perform based on any one or more of the following, in any combination:

a capability of the electronic actor;

an internal state of the electronic actor (e.g., the first state 126 and/or the second state 128);

logic stored in, or otherwise accessible to, the electronic actor (e.g., computer program instructions stored in, or otherwise accessible to, the electronic actor, which the electronic actor may execute to interpret the cue signal); and input received from at least one sensor in an environment of the electronic actor, such as one or more cameras, microphones, infrared sensors, pressure sensors, and/or piezoelectric sensors, where such sensor(s) may, for example, be contained in or coupled to the electronic actor.

Furthermore, the same cue signals 122 may be provided to two electronic actors 124 (at the same time or at different times), in response to which the two electronic actors 124 may select and perform different actions. For example, assume that one of the electronic actors 124 has wheels and that the other electronic actor 124 has legs. In response to receiving cue signals 122 representing a cue signal to move to the left, the first electronic actor 124 may select and perform an action of rolling its wheels in a manner that moves the electronic actor to move to the left, whereas the second electronic actor 124 may select and perform an action of using its legs to walk to the left.

When the electronic actor coordination module 120 sends the cue signals 122, the electronic actor coordination module 120 may address some or all of those cue signals 122 to specific ones of the electronic actors 124. For example, the electronic actor coordination module 120 may address a first one of the cue signals 122 to a first one of the electronic actors 124, and may address a second one of the cue signals 122 to a second one of the electronic actors 124.

Alternatively, for example, one or more of the cue signals 122 may not be addressed to any of the electronic actors 124. For example, the electronic actor coordination module 120 may send, transmit, or otherwise output one of the cue signals 122 without addressing that cue signal to any of the electronic actors 124, such as by broadcasting that cue signal. One or more of the electronic actors 124 may receive such a cue signal, associate the received cue signal with itself, and then perform any of the operations disclosed herein in connection with received cue signals, such as interpreting the received cue signal and performing an action based on that interpretation. A second one of the electronic actors 124 may receive the same cue signal and may not associate the received cue signal with itself or interpret the received cue signal.

As yet another example, the electronic actor coordination module 120 may address one of the cue signals 122 to a first one of the electronic actors 124. A second one of the electronic actors 124 may receive that cue signal, interpret it in any of the ways disclosed herein, and perform an action based on that interpretation in any of the ways disclosed herein. In other words, the electronic actor that receives, interprets, and acts on a cue signal may not be the electronic actor to which the cue signal was addressed.

Many other possibilities fall within the scope of the present invention. For example, the electronic actor coordination module 120 may address one of the cue signals 122 to a first one of the electronic actors 124. The first one of the electronic actors may receive that cue signal, not perform an action based on it, and forward the cue signal (e.g., in any of the ways disclosed herein in connection with the electronic actor coordination module 120 sending the cue signals 122) to a second one of the electronic actors, which may receive, interpret, and act on the cue signal in any of the ways disclosed herein. Alternatively, the first one of the electronic actors may receive that cue signal, interpret it in any of the ways disclosed herein, perform an action based on it in any of the ways disclosed herein, and forward the cue signal to a second one of the electronic actors, which may receive, interpret, and act on the cue signal in any of the ways disclosed herein. As this example implies, more than one of the electronic actors 124 may receive, interpret, and perform an action based on a single one of the cue signals 122, in which case the two or more electronic actors may perform the same or different actions as each other based on the same one of the cue signals 122.

The electronic actor 124 may perform any of a plurality of actions in response to receiving the cue signals 122. In general, the electronic actor 124 may, for example, transition from a first state 126 into a second state 128 in response to receiving the cue signals 122. Such a state transition may include, for example, any one or more of the following, in any combination:

an external change in state, such as performing a physical movement, generating audio output, generating video output (e.g., text, an image, and/or a video), receiving data and/or cue signals from another device (e.g., another one of the electronic actors 124), and/or transmitting data and/or control signals to another device (e.g., another one of the electronic actors 124); and an internal change in state, such as generating data, storing data, and/or modifying stored data.

One example of audio output that an electronic actor may generate based on a cue signal is audio output based on text in one or more of the lines 108 in the script 106. Such audio output may, for example, be speech representing the text, such as prerecorded speech or synthesized speech that is generated based on the text.

Examples of physical movement that an electronic actor may perform based on a cue signal are any one or more of the following, in any combination:

moving the electronic actor in a direction specified by the cue signal;

moving the electronic actor to a target specified by the cue signal, where the target may, for example, be another electronic actor or a location in an environment of the first electronic actor.

The electronic actors 124 may provide feedback 130 to the electronic actor coordination module 120 (FIG. 2, operation 212). The electronic actors 124 may generate the feedback 130 in any of a variety of ways, and the feedback 130 may have any of a variety of content. As one example, the electronic actors 124 may include one or more sensors, which may sense one or more parameter values, generate sensor output based on those parameter values, and provide the sensor output (or data derived from the sensor output) as the feedback 130. As another example, a user may provide manual input to the electronic actors 124, and the electronic actors 124 may generate the feedback 130 based on that manual input.

The electronic actor coordination module 120 may generate the cue signals 122 described above based on a portion of the script 106, such as an initial portion of the script 106 (e.g., the first clause, sentence, or other section of the script 106). If the electronic actor coordination module 120 has not yet reached the end of the script 106 (FIG. 2, operation 214), the electronic actor coordination module 120 may repeat operations 206 and 208 for a subsequent portion of the script 106 (e.g., the next clause, sentence, or other section of the script 106), and the electronic actors 124 may perform one or more actions based on the subsequent cue signals received from the electronic actor coordination module 120. The electronic actor coordination module 120's generation of the subsequent cue signals may be influenced by any of the feedback 130 it previously received from the electronic actors 124. This process may continue until the electronic actor coordination module 120 determines, in operation 214, that it has reached the end of the script 106.

Any one or more of the electronic actors 124 may be, include, or be part of any of the following, in any combination: a robot, a toy, a digital character, a wearable technology/object embedded with technology, and a computer. Any two or more of the electronic actors 124 may be the same as, or different from, each other, in any combination. For example, two or more of the electronic actors 124 may be instances of the same model of device (e.g., the same model of robot). As another example, two or more of the electronic actors may be instances of different models of the same type of device. For example, a first of the electronic actors 124 may be an instance of a first model of robot, and a second one of the electronic actors 124 may be an instance of a second model of robot. As another example, two or more of the electronic actors 124 may be instances of different types of device. As merely one example of this, one of the electronic actors 124 may be a robot and another one of the electronic actors may be a computer (e.g., a desktop computer, a laptop computer, or a smartphone).

The story 102 may be in any of a variety of forms, such as playscript, essay, illustration (e.g., a comic or a painting, which is parsed by the parsing module 104 into the script 106). The story 102 may include one or more stories of any kinds, such as descriptions of historical events, training guides for physical procedures, descriptions of routines, descriptions of locations for use in walking tours, stories for use in escape rooms and ad-hoc interactive environments, recipes, and descriptions of presentations with physical props.

As described above, the process of generating the script 106 based on the story 102 may include, for example, parsing the story 102 into one or more characters 112, one or more lines 108, and one or more locations 116. Each of the lines 108 may, for example, be or include one of the following: dialogue, a movement, a sound effect, and a lighting cue. As this implies, the resulting lines 108 may include a plurality of lines 110*a-i* of different types, such as one line of dialogue and one line that refers to a movement. Each of the characters 112 may be associated with a distinct one of the electronic actors 124. The electronic actor coordination module 120 may, for each of the characters 112 and corresponding line, provide cue signals 122 representing the line to the electronic actor 124 associated with the character.

In the case of lines 108 that are dialogue, the electronic actor coordination module 120 may use a text-to-speech engine to convert the text in the script 106 representing the dialogue into speech. The cue signals 122 may be signals which control the electronic actors 124 to produce audio output representing the speech.

The story 102 and/or script 106 may be written in a manner that is partially or entirely independent of the electronic actors 124. For example, the script 106 and/or story 102 may describe a state change in generic terms which do not specify a particular action to be performed. The electronic actor coordination module 120 may, based on that state change description, generate cue signals 122 which cause the electronic actors 124 to perform one or more actions which were not explicitly described by the description of the state change in the script 106. As a particular example, the story 102 and/or script 106 may include text that describes an emotion, without explicitly describing any particular action to convey that emotion. The electronic actor coordination module 120 may, based on the text that describes the emotion, generate cue signals 122 that cause the electronic actors 124 to perform one or more actions that convey the described emotion.

Embodiments of the present invention have a variety of benefits, such as allowing the user to focus on the desired experience, rather than on the mechanics of making it work. This allows for a more expressive and intuitive manner of orchestration. Another benefit of embodiments of the present invention is that the story 102 may be interpreted multiple times in different ways. For example, the electronic actor coordination module 120 may interpret the script 106 a first time to produce a first set of cue signals 122 for controlling a first set of electronic actors 124 to perform a first set of actions, and then interpret the script 106 a second time to produce a second set of cue signals 122 for controlling a second set of electronic actors to perform a second set of actions. This may be useful, for example, if the first and second sets of electronic actors have different capabilities.

The various components of the system 100 may be implemented in any of a variety of devices, and may communicate with each other in any of a variety of ways. For example, the parsing module 104 and the electronic actor coordination module 120 may be implemented, in whole or in part, on a computing device, such as a desktop computer, laptop computer, smartphone, or tablet computer. Each of the electronic actors 124 may, for example, be implemented, in whole or in part, as a computing device or other electronic device, such as a toy or robot. The parsing module 104 and/or the electronic actor coordination module 120 may be implemented in one or more devices that are physically distinct from the electronic actors 124, such as in the case when the electronic actor coordination module 120 is implemented on a computing device and the electronic actors 124 are implemented on a plurality of toys or robots that are physically distinct from the computing device. The electronic actor coordination module 120 may communicate with the electronic actors 124 by wired and/or wireless communication (e.g., Bluetooth).

The electronic actor coordination module 120 may be distributed across more than one computing device. For example, the parsing module 104 may perform the script parsing functions disclosed herein on a local computing device, and offload speech recognition functions disclosed herein to a remote speech recognition server that the local computing device communicates with over the Internet.

Referring to FIG. 3, a diagram is shown of a system 300 for loading a story (i.e., the story 102) according to one embodiment of the present invention. The story includes a plurality of lines, each of which may include any one or more of the following, in any combination: plain text (e.g., one or more words, clauses, and/or sentences), structured text (e.g., text marked up with XML/HTML tags), hyperlinks, audio content, image content, and video content. A story execution engine (which may be implemented as part of the parsing module 104 and/or the electronic actor coordination module 120 of FIG. 1) processes the story to create characters and lines. For example, the story execution engine may identify a plurality of characters identified in the story, such as by identifying names of characters at the beginnings of lines in the script. The story execution engine may create the lines by identifying lines of dialogue, stage directions, audio content, image content, video content, hyperlinks, and other content in the story.

The story execution engine may create associations between each of the characters and corresponding lines, based on the story. For example, if the story includes text of the form: "<Character Name>:<Dialogue>," then the story execution engine may create a character with the name <Character Name>, create a line with the text <Dialogue>, and create an association between the character named <Character Name> and the line with the text <Dialogue>.

The story execution engine may assign each of the characters to a corresponding one of the electronic actors 124. These assignments will be used by the system 300 to provide cue signals 122 to the electronic actors 124. For any electronic actor that is assigned a corresponding character, the story execution engine may provide information about that character (such as its name) to the electronic device, which may receive and store that character information.

The story execution engine may identify any lines that require the transmission of a large amount of data, such as audio files and video files. For any such lines, the story execution engine may transmit the corresponding data to the electronic actor, which may receive and store the data.

Figure 4:
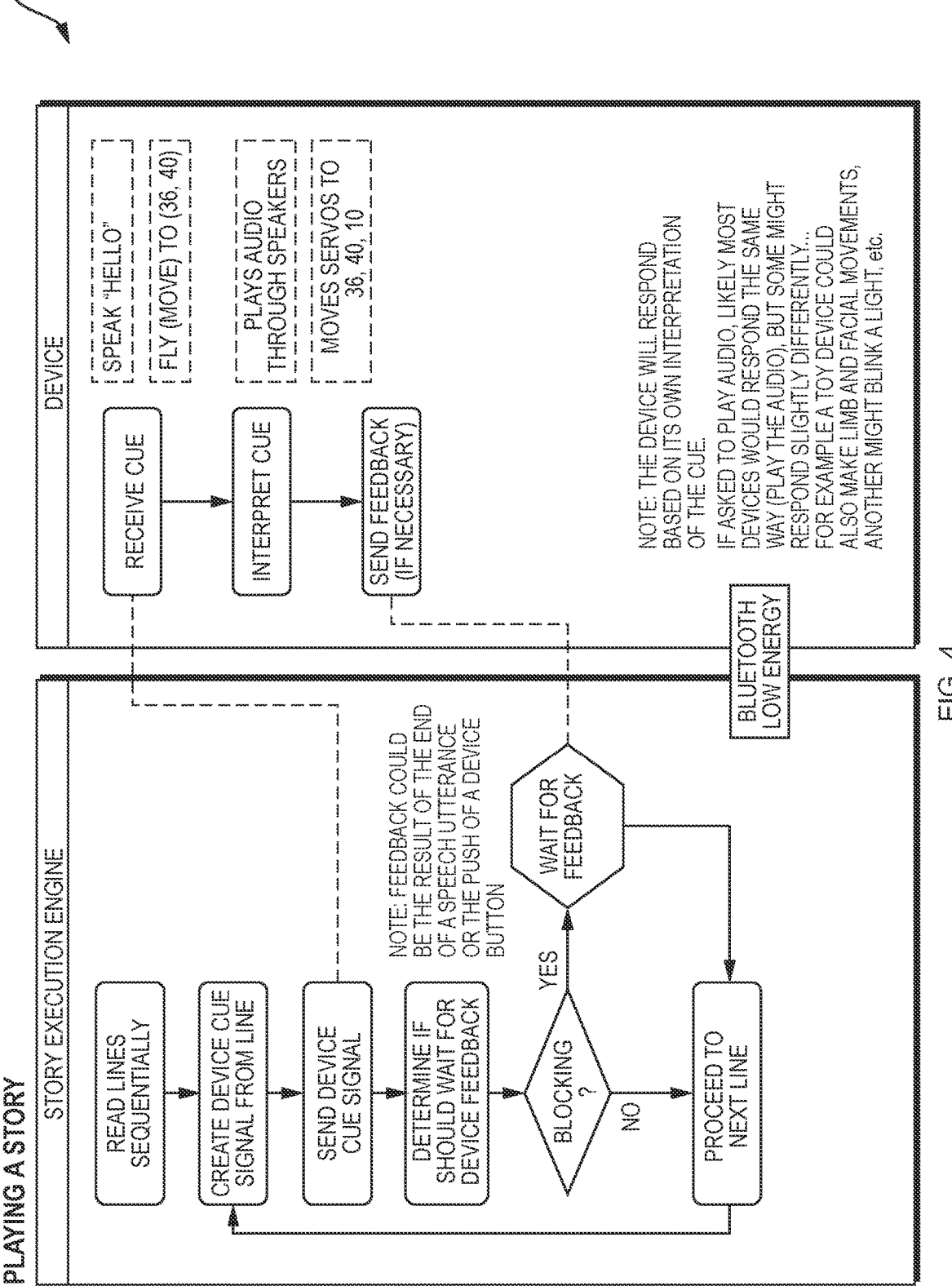
FIG. 4 is a diagram of a system for playing (executing) a script according to one embodiment of the present invention.

Referring to FIG. 4, a diagram is shown of a system 400 for playing (executing) the script 106 according to one embodiment of the present invention. The system 400 may execute after the system 300 of FIG. 3 has executed.

The story execution engine may read the previously-created lines sequentially and, for each line, perform one or more of the following:

Create a cue based on the line.

Identify the character associated with the line.

Identify the electronic actor associated with that character.

Create a cue signal based on one or more of the line, the character, and the electronic actor.

Send the cue signal to the identified electronic actor.

Determine whether to wait for feedback from the electronic actor.

If feedback is to be waited for, then the story execution engine waits for feedback from the electronic actor.

Otherwise, the story execution engine proceeds to the next line and repeats the steps above.

When an electronic actor receives a cue signal for a particular line, the electronic actor interprets the cue and performs a corresponding action in any of the ways disclosed herein. If appropriate, the electronic actor sends feedback to the electronic actor coordination module 120 in the manner described above in connection with FIGS. 1 and 2. The references to Bluetooth low energy in FIGS. 3 and 4 are merely examples and do not constitute limitations of the present invention.

Figure 5:
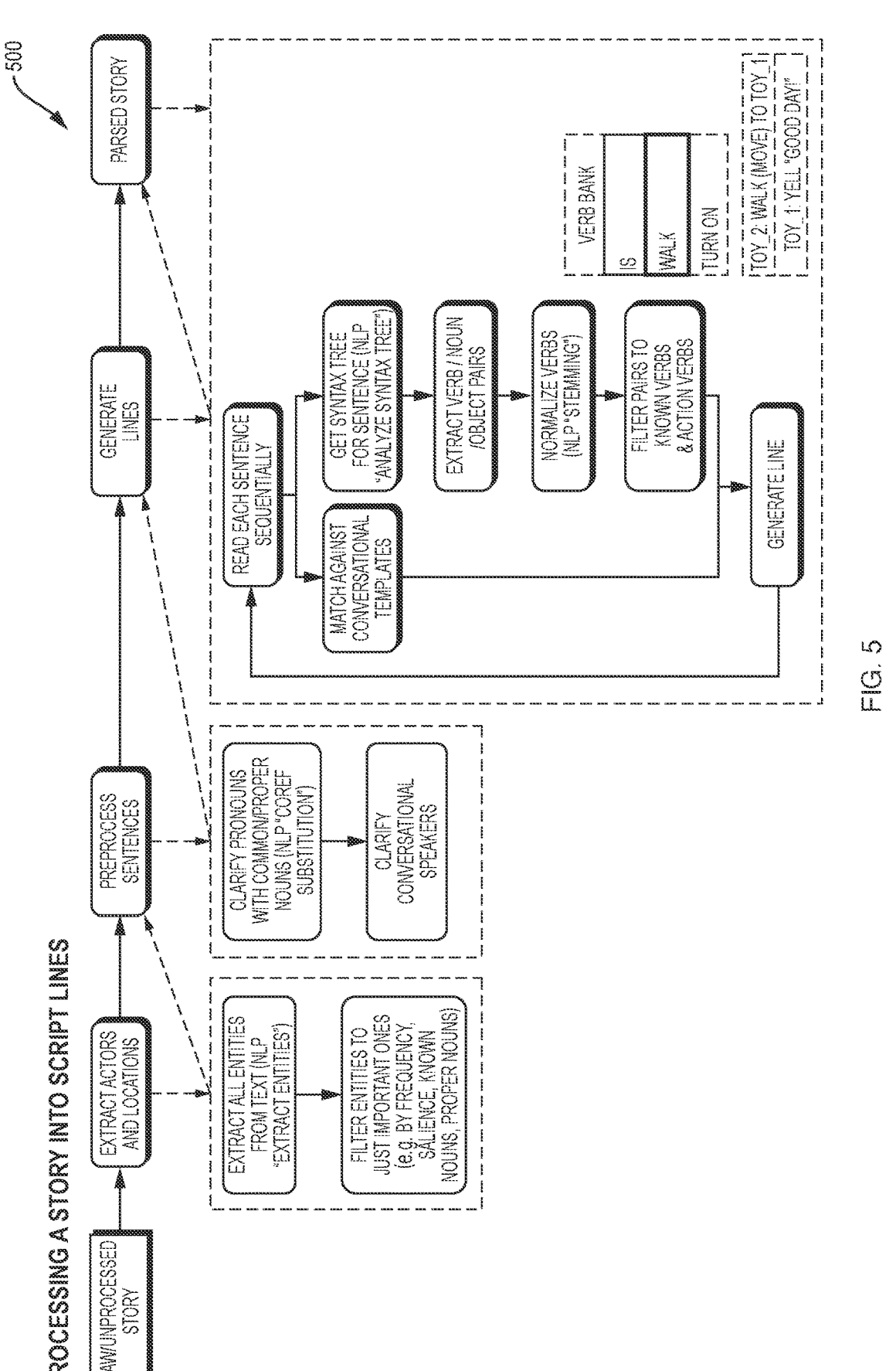
FIG. 5 is a diagram illustrating a system for processing a script according to one embodiment of the present invention.

It was stated above that the story execution engine may process the script 106 into lines. FIG. 5 shows a diagram illustrating a system 500 for performing such processing according to one embodiment of the present invention. The story execution engine extracts actors and locations from the script 106. For example, the story execution engine may use NLP to extract all entities from text in the script 106, and filter the extracted entities to include only important entities (e.g., by frequency, salience, known nouns, and/or proper nouns). The result is a list of actors and locations.

The story execution engine may preprocess sentences in the script 106. For example, the story execution engine may replace pronouns in the script 106 with common/proper nouns, and may clarify conversational speakers in the script 106. The result is a modified version of the script 106 in which the sentences have been preprocessed. The remainder of the system of FIG. 5 may operate on the modified script and the extracted actors and locations.

The story execution engine may generate lines and cue signals. For example, the story execution engine may read each sentence in the script 106 sequentially, and either: (1) match the sentence against conversational templates; or (2) use NLP to get a syntax tree for the sentence, extract verb/noun/object pairs from the sentence, use NLP stemming to normalize verbs, and filter pairs to leave only known verbs and action verbs. The story execution engine then generates the line and/or cue signal.

In some embodiments, the techniques described herein relate to a method performed by at least one computer processor executing computer program instructions stored on at least one non-transitory computer-readable medium, the method including: (A) generating, for a first line in a plurality of lines, based on the first line, a first cue signal corresponding to the first line; (B) identifying a first character associated with the first line; and (C) identifying a first electronic actor associated with the first character.

The method may further include, before (A): (D) receiving a story, the story including at least one of text data, audio data, image data, and video data; (E) generating, based on the story, a script representing the plurality of lines and a plurality of characters, wherein at least some of the plurality of lines are associated with at least some of the plurality of characters.

The story may include any one or more of the following, in any combination: audio data, image data, video data, and text data (e.g., dialogue). The text data may, for example, include text written in a natural language.

The first electronic actor may, for example, be, include, or be included in a robot.

The method may further include: (D) sending the first cue signal to the first electronic actor. The method may further include: (E) at the first electronic actor, interpreting the first cue signal to identify a first action to perform; and (F) at the first electronic actor, performing the first action. Operation (E) may include interpreting the first cue signal to identify the first action to perform based on any one or more of the following, in any combination: at least one capability of the first electronic actor, an internal state of the first electronic actor, logic stored in the first electronic actor, and input received from at least one sensor in an environment of the first electronic actor.

Performing the first action may include moving the first electronic actor based on the first cue signal. Moving the first electronic actor may, for example, include either or both of the following, in any combination: moving the first electronic actor in a direction specified by the first line, and moving the first electronic actor to a target specified by the first line. The target may, for example, include a location in an environment of the first electronic actor. The target may, for example, include a second electronic actor.

The first line may, for example, include text, and interpreting the first cue signal may include, for example, at the first electronic actor, generating audio data based on the text in the first line.

The method may, for example, be performed by a computing device that is physically distinct from the first electronic actor, and the method may further include: (G) at the first electronic actor, providing a feedback signal to the computing device. The method may further include: (H) before (G), at the first electronic actor, obtaining sensor data via a sensor; and wherein (G) includes providing the sensor data to the computing device. The method may further include: (H) before (G), at the first electronic actor, obtaining input from a user via an input device; and wherein (G) includes providing the input to the computing device.

The method may further include: (E) generating, for a second line in the plurality of lines, based on the second line, a second cue signal corresponding to the second line; (F) identifying a second character associated with the second line; (G) identifying a second electronic actor associated with the second character; and (H) sending the second cue signal to the second electronic actor.

The method may be performed by a computing device that is physically distinct from the first electronic actor and the second electronic actor, and the method may further include: (I) at the first electronic actor, interpreting the first cue signal to identify a first action to perform; (J) at the first electronic actor, performing the first action; (K) at the second electronic actor, interpreting the second cue signal to identify a second action to perform; and (L) at the second electronic actor, performing the second action; wherein the first electronic actor is physically distinct from the second electronic actor; and wherein the first action differs from the second action.

The method may further include: (D) transmitting the first cue signal; (E) at the first electronic actor, receiving the first cue signal; (F) at the first electronic actor, associating the first cue signal with the first electronic actor; and (G) at the first electronic actor, interpreting the first cue signal to identify a first action to perform; and (H) at the first electronic actor, performing the first action. The method may further include: (I) at a second electronic actor, receiving the first cue signal; (J) at the second electronic actor, not associating the first cue signal with the second electronic actor.

The method may further include: (D) transmitting the first cue signal, wherein the first cue signal is addressed to the first electronic actor; (E) at a second electronic actor, interpreting the first cue signal to identify a first action to perform; and (F) at the second electronic actor, performing the first action.

The method may further include: (D) generating, for a second line in the plurality of lines, based on the second line, a second cue signal corresponding to the second line; (E) identifying a second character associated with the second line; (F) providing the second cue signal representing the second line to the first electronic actor.

The first cue signal corresponding to the first line may include text. The text may include text, written in a natural language, representing dialogue.

The first cue signal may include an audio cue. The first cue signal may specify speech. The first cue signal may include a movement cue.

The first electronic actor may perform (A).

The method may further include: (D) at the first electronic actor, sending the first cue signal to a second electronic actor.

In some embodiments, the techniques described herein relate to a system including: a script including a plurality of lines; an electronic actor coordination module; and a first electronic actor; wherein the electronic actor coordination module includes computer program instructions for performing a method including: (A) generating, for a first line in the plurality of lines in the script, based on the first line, a first cue signal corresponding to the first line; (B) identifying a first character associated with the first line; (C) identifying a first electronic actor associated with the first character; and (D) generating the first cue signal representing the first line.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Embodiments of the present invention include features which are only possible and/or feasible to implement with the use of one or more computers, computer processors, and/or other elements of a computer system. Such features are either impossible or impractical to implement mentally and/or manually. For example, embodiments of the present invention automatically parse a high-level description of a story to automatically identify instructions to be provided to one or more machines (e.g., robots), which then automatically interpret those instructions to perform one or more actions automatically. Such functions are inherently rooted in computer technology and cannot be performed mentally or manually.

Any claims herein which affirmatively require a computer, a processor, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field- Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

Any step or act disclosed herein as being performed, or capable of being performed, by a computer or other machine, may be performed automatically by a computer or other machine, whether or not explicitly disclosed as such herein. A step or act that is performed automatically is performed solely by a computer or other machine, without human intervention. A step or act that is performed automatically may, for example, operate solely on inputs received from a computer or other machine, and not from a human. A step or act that is performed automatically may, for example, be initiated by a signal received from a computer or other machine, and not from a human. A step or act that is performed automatically may, for example, provide output to a computer or other machine, and not to a human.

The terms "A or B," "at least one of A or/and B," "at least one of A and B," "at least one of A or B," or "one or more of A or/and B" used in the various embodiments of the present disclosure include any and all combinations of words enumerated with it. For example, "A or B," "at least one of A and B" or "at least one of A or B" may mean: (1) including at least one A, (2) including at least one B, (3) including either A or B, or (4) including both at least one A and at least one B.

What is claimed is:

1. A method performed by a computing device, the computing device including at least one computer processor executing computer program instructions stored on at least one non-transitory computer-readable medium, the method comprising:

(A) generating, for a first line in a plurality of lines, based on the first line, a first cue signal corresponding to the first line, wherein generating the first cue signal comprises using natural language processing (NLP) to identify verb/noun/object pairs based on the first line, and wherein the first cue signal comprises an action verb identified based on the first line;

(B) identifying a first character associated with the first line, wherein identifying the first character comprises using NLP to extract entities from the first line;

(C) identifying a first electronic actor associated with the first character, wherein the first electronic actor comprises at least one of a first robot or a first toy, and wherein the computing device is physically distinct from the first electronic actor;

(D) after (A), sending the first cue signal from the computing device to the first electronic actor wirelessly;

(E) after (D), generating, for a second line in the plurality of lines, based on the second line, a second cue signal corresponding to the second line;

(F) identifying a second character associated with the second line;

(G) identifying a second electronic actor associated with the second character, wherein the second electronic actor comprises at least one of a second robot or a second toy, wherein the computing device is physically distinct from the second electronic actor, and wherein the second electronic actor is physically distinct from the first electronic actor;

(H) after (E), sending the second cue signal from the computing device to the second electronic actor wirelessly;

(I) after (H), generating, for the first line in the plurality of lines, based on the first line, a third cue signal corresponding to the first line, wherein the third cue signal differs from the first cue signal; and (J) sending the third cue signal from the computing device to the first electronic actor wirelessly;

(K) at the first electronic actor, interpreting the first cue signal to identify a first action to perform; and (L) at the first electronic actor, performing the first action.

2. The method of claim 1, further comprising, before (A):

(K) receiving a story, the story comprising at least one of text data, audio data, image data, and video data;

(L) generating, based on the story, a script representing the plurality of lines and a plurality of characters, wherein at least some of the plurality of lines are associated with at least some of the plurality of characters.

3. The method of claim 2, wherein the story comprises audio data.

4. The method of claim 2, wherein the story comprises video data.

5. The method of claim 1, wherein the first electronic actor comprises a robot.

6. The method of claim 1, wherein (K) comprises interpreting the first cue signal to identify the first action to perform based on at least one capability of the first electronic actor.

7. The method of claim 1, wherein (K) comprises interpreting the first cue signal to identify the first action to perform based on input received from at least one sensor in an environment of the first electronic actor.

8. The method of claim 1, wherein performing the first action comprises moving the first electronic actor based on the first cue signal.

9. The method of claim 1, wherein the method further comprises: (M) at the first electronic actor, providing a feedback signal to the computing device.

10. The method of claim 9, wherein the method further comprises:

(N) before (M), at the first electronic actor, obtaining input from a user via an input device; and wherein (M) comprises providing the input to the computing device.

11. The method of claim 1, further comprising:

(K) at the first electronic actor, interpreting the first cue signal to identify a first action to perform;

(L) at the first electronic actor, performing the first action;

(M) at the second electronic actor, interpreting the second cue signal to identify a second action to perform; and (N) at the second electronic actor, performing the second action;

wherein the first action differs from the second action.

12. The method of claim 1, further comprising:

(K) at the first electronic actor, receiving the first cue signal;

(L) at the first electronic actor, associating the first cue signal with the first electronic actor; and (M) at the first electronic actor, interpreting the first cue signal to identify a first action to perform; and (N) at the first electronic actor, performing the first action.

13. The method of claim 1:

wherein the first cue signal is addressed to the first electronic actor;

and wherein the method further comprises:

(K) at the second electronic actor, interpreting the first cue signal to identify a first action to perform; and (L) at the second electronic actor, performing the first action.

14. The method of claim 1, further comprising:

(K) at the first electronic actor, sending the first cue signal to the second electronic actor wirelessly.

15. The method of claim 1, further comprising:

(K) wherein the first cue signal and the third cue signal are generated using different interpretation algorithms applied to identical content of the first line.

16. A system comprising:

a script comprising a plurality of lines;

a computing device comprising an electronic actor coordinate module;

a first electronic actor that is physically distinct from the computing device, wherein the first electronic actor comprises at least one of a first robot or a first toy; and a second electronic actor that is physically distinct from the computing device and the first electronic actor, wherein the second electronic actor comprises at least one of a second robot or a second toy;

wherein the electronic actor coordination module comprises computer program instructions for performing a method comprising:

(A) generating, for a first line in a plurality of lines, based on the first line, a first cue signal corresponding to the first line, wherein generating the first cue signal comprises using natural language processing (NLP) to identify verb/noun/object pairs based on the first line, and wherein the first cue signal comprises an action verb identified based on the first line;

(B) identifying a first character associated with the first line, wherein identifying the first character comprises using NLP to extract entities from the first line;

(C) identifying a first electronic actor associated with the first character, wherein the first electronic actor comprises at least one of a first robot or a first toy, and wherein the computing device is physically distinct from the first electronic actor;

(D) after (A), sending the first cue signal from the computing device to the first electronic actor wirelessly;

(E) after (D), generating, for a second line in the plurality of lines, based on the second line, a second cue signal corresponding to the second line;

(F) identifying a second character associated with the second line;

(G) identifying a second electronic actor associated with the second character, wherein the second electronic actor comprises at least one of a second robot or a second toy, wherein the computing device is physically distinct from the second electronic actor, and wherein the second electronic actor is physically distinct from the first electronic actor;

(H) after (E), sending the second cue signal from the computing device to the second electronic actor wirelessly;

(I) after (H), generating, for the first line in the plurality of lines, based on the first line, a third cue signal corresponding to the first line, wherein the third cue signal differs from the first cue signal; and (J) sending the third cue signal from the computing device to the first electronic actor wirelessly;

(K) at the first electronic actor, interpreting the first cue signal to identify a first action to perform; and (L) at the first electronic actor, performing the first action.

\* \* \* \* \*